(12) United States Patent
Schwenkreis

(10) Patent No.: US 6,553,359 B1
(45) Date of Patent: Apr. 22, 2003

(54) DATA MINING FOR ASSOCIATION RULES AND SEQUENTIAL PATTERNS WITHIN DATA OF INHOMOGENEOUS TYPE

(75) Inventor: Friedemann Schwenkreis, Leinfelden-Echterdingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/559,617

(22) Filed: Apr. 27, 2000

(30) Foreign Application Priority Data

Apr. 27, 1999 (EP) .............................. 99108219

(51) Int. Cl.[7] .............................. G06N 5/02
(52) U.S. Cl. .............................. 706/46; 707/1; 707/6; 707/7
(58) Field of Search .............................. 706/45, 46, 47; 700/49; 707/1, 6, 7

(56) References Cited

U.S. PATENT DOCUMENTS 5,832,482 A * 11/1998 Yu et al. ..................... 707/1
5,933,818 A * 8/1999 Kasravi et al. ............... 706/12

* cited by examiner

*Primary Examiner*—Thomas Black
*Assistant Examiner*—Joseph P. Hirl
(74) *Attorney, Agent, or Firm*—Ronald L. Drumheller; Khanh Q. Tran

(57) ABSTRACT

The invention relates to a computerized method for data mining for association rules and/or sequential patterns in a multitude of records. The invention is applicable to records that include a transaction-identification and at least one transaction-item with a corresponding item-type, wherein the multitude of records include transaction-items to be mined having different item-types. The method further includes a preprocessing step for transforming each record into one or more transaction-records in transaction-format. For each transaction-item to be data mined in a record, a transaction-record is generated and the transaction-record includes at least the transaction-identification of the record and an encoded transaction-item. The encoded transaction-item encodes the transaction-item and its corresponding item-type into one value. Finally the method includes a mining step wherein a state of the art data-mining technique is applied to the transaction-records for data mining for association rules and/or sequential patterns.

7 Claims, 3 Drawing Sheets

| Customer | TA | Age | Gender | State | Item |
|---|---|---|---|---|---|
| 100 | 1 | 40 | m | CA | 10 |
| 100 | 2 | 42 | m | MA | 20 |
| 100 | 3 | 50 | m | MA | 30 |
| 105 | 4 | 50 | f | CA | 30 |
| 105 | 5 | 52 | f | CA | 20 |
| 107 | 6 | 35 | m | MA | 20 |

*FIG. 1*

| TA | Item |
|---|---|
| 1 | 10 |
| 2 | 20 |
| 3 | 30 |
| 4 | 30 |
| 5 | 20 |
| 6 | 20 |

*FIG. 2A*

| Customer | TA | Item |
|---|---|---|
| 100 | 1 | 10 |
| 100 | 2 | 20 |
| 100 | 3 | 30 |
| 105 | 4 | 30 |
| 105 | 5 | 20 |
| 107 | 6 | 20 |

*FIG. 2B*

Multi-Column Data

| TA | 1st Item | 2nd Item | 3rd Item | 4th Item |
|----|----------|----------|----------|----------|
| 1  | 10       | 20       | 30       | 40       |
| 2  | 20       | 40       |          |          |
| 3  | 10       | 30       | 50       |          |
| 4  | 30       | 40       | 50       |          |
| 5  | 20       | 40       | 70       | 80       |

Transaction Data

| TA | Item |
|----|------|
| 1  | 10   |
| 1  | 20   |
| 1  | 30   |
| 1  | 40   |
| 2  | 20   |
| 2  | 40   |
| 3  | 10   |
| 3  | 30   |
| 3  | 50   |
| 4  | 30   |
| 4  | 40   |
| 4  | 50   |
| 5  | 20   |
| 5  | 40   |
| 5  | 70   |
| 5  | 80   |

FIG. 3

DATA MINING FOR ASSOCIATION RULES AND SEQUENTIAL PATTERNS WITHIN DATA OF INHOMOGENEOUS TYPE

BACKGROUND OF THE INVENTION

1. Field of the Invention

The present invention relates to data mining technology. More particularly, it relates to the area of mining for association rules and/or sequential patterns within data assets.

2. Description and Disadvantages of Prior Art

Over the past two decades there has been a huge increase in the amount of data being stored in databases as well as the number of database applications in business and the scientific domain. This explosion in the amount of electronically stored data was accelerated by the success of the relational model for storing data and the development and maturing of data retrieval and manipulation technologies. While technology for storing the data developed fast to keep up with the demand, little stress was paid to developing software for analyzing the data until recently when companies realized that hidden within these masses of data was a resource that was being ignored. The huge amounts of stored data contains knowledge about a number of aspects of their business waiting to be harnessed and used for more effective business decision support. Database Management Systems used to manage these data sets at present only allow the user to access information explicitly present in the databases i.e. the data. The data stored in the database is only a small part of the 'iceberg of information' available from it. Contained implicitly within this data is knowledge about a number of aspects of their business waiting to be harnessed and used for more effective business decision support. This extraction of knowledge from large data sets is called Data Mining or Knowledge Discovery in databases and is defined as the non-trivial extraction of implicit, previously unknown and potentially useful information from data. The obvious benefits of Data Mining has resulted in a lot of resources being directed towards its development.

Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a particular time period after the first purchase.

Data mining uses several techniques to find pieces of knowledge in large amounts of data. Two of these techniques are the so-called mining for association rules and the mining for sequential patterns.

Identifying association rules from a large database of transactions is an essential part of data mining. An association rule is an expression of the form X→Y, where X and Y are sets of items. In the retail domain, the data to be mined typically consist of transactions, where each transaction is characterized by a set of items. For example, the database may contain customers' sale transactions on shoes and jackets. A possible association rule may be of the form "30 percent of transactions that contain jackets also contain shoes; 10 percent of all transactions contain both shoes and jackets". The 30 percent value is referred to as the confidence of the rule, while the 10 percent value is the support of the rule. The task of mining association rules involves finding all the association rules from the transactions that satisfy certain user-specified minimum support and confidence constraints.

Conceptually, the problem may be viewed as finding the association rules from a relational table of records. Each record may represent a transaction, as in the case of a retail transaction database, or other data items in the database. Each record has one or more attributes where each attribute corresponds to an item of the transaction.

Another essential part of data mining relates to identification of sequential pattern. This involves rules that are based on temporal data. Suppose we have a database of natural disasters. From such a database if we conclude that whenever there was an earthquake in Los Angeles, the next day Mt. Kilimanjaro erupted, such a rule would be a sequence rule. Such rules are useful for making predictions which could be useful in making market gains or for taking preventive action against natural disasters. The factor that differentiates sequence rules from other rules is the temporal factor.

Other applications of data mining include catalog design, add-on sales, store layout, and customer segmentation based on buying patterns and many more. Typically the databases involved in these applications are very large. It is imperative, therefore, to have fast algorithms for this task.

Although several methods of mining for association rules and mining for sequential patterns have been proposed, only methods derived from the so-called APRIORI approach (see R. Agrawal, S. Rikant, Fast Algorithms for Mining Association Rules, in Proceedings of the 20th VLDB Conference, 1994) have been proven to be efficient enough to process large data volumes.

The APRIORI approach depends on a special format of the data called transaction format. In case of associations the transaction format conceptually consists of only two columns, namely a "transaction identifier" and an "item identifier". In case of sequential patterns conceptually it consists of three columns, namely a "transaction group identifier", a "transaction identifie", and an "item identifier". A much more serious drawback of the APRIORI approach according the current state of the art is that it requires that all of the "item identifiers" relate to the same item type. As a result the APRIORI approach is only capable of deriving association rules or sequences between items of the same type. If for instance the item identifier relates to a certain product bought by a certain customer the APRIORI technique would be capable of deriving only rules of the form: if a customer buys PRODUCT1 then he also will buy PRODUCT2 with the probability of X%. The APRIORI approach would not be able include in its generated rules items of other types, like for instance the gender, the age, the profession, the place of residence or other aspects of the customers. It can be expected that once a multitude of different item types can be included in the process of derivation of rules the importance of the derived rules can be significantly increased as they would be much more selective in nature.

OBJECTIVE OF THE INVENTION

The invention is based on the objective to provide a computerized method for data mining for association rules and or sequential patterns of a multitude of records, wherein the multitude of records comprise transaction-items of different item-types.

SUMMARY AND ADVANTAGES OF THE INVENTION

The objectives of the invention are solved by the independent claims. Further advantageous arrangements and embodiments of the invention are set forth in the respective subclaims.

The invention relates to a computerized method for data mining for association rules and/or sequential patterns of a multitude of records. The invention is applicable to records comprising a transaction-identification and at least one transaction-item with a corresponding item-type wherein said multitude of records comprise transaction-items of different item-types. The proposed method further comprises a preprocessing-step for transforming each record into one or more transaction-records of transaction-format. According to said transaction format for each transaction-item in said record a transaction-record is generated and said transaction-record comprises at least the transaction-identification of said record and an encoded transaction-item encoding said transaction-item and its corresponding item-type into one value. Finally said method comprises a mining-step wherein a state of the art data-mining techniques is applied to said transaction-records for data mining for association rules and/or sequential patterns.

The current invention extends data mining technology according to the current state of the art and is now also supporting the mining for association rules and/or sequential patterns based on data assets comprising items of a multitude of item types. While current activities in this area of technology are concentrating on the search for new and advanced mining algorithms the current invention is able to achieve this goal by features pointing in a completely different and surprising direction. Instead of proposing a new mining algorithm the current invention suggests a new pre-processing step which transforms the data to be mined into a new encoding scheme. The usage of multiple fields to be defined as item fields for efficient mining for association/sequential patterns is supported without a need to introduce a new algorithm because data is not in transaction format. Thus mining algorithms proved to be very efficient and optimized during the last years are still applicable.

BRIEF DESCRIPTION OF THE DRAWINGS

FIG. 1 depicts an example of a typical database table data mining technology is applied to. The table is made up of a multitude of records which in turn are made up of a multitude of fields (representing the table columns).

FIG. 2 reflects the transformation result of the table of FIG. 1 into transaction format. FIG. 2a visualizes the transaction format adapted for mining of association rules while FIG. 2b portrays the "transaction format" adapted for mining of sequential pattern.

FIG. 3 visualizes the only solution known in the state of the art which is capable of treating database records with more than one item. This solution is limited to the case where all items relate to the same item type.

DESCRIPTION OF THE PREFERRED EMBODIMENT

Figures 4, 5:
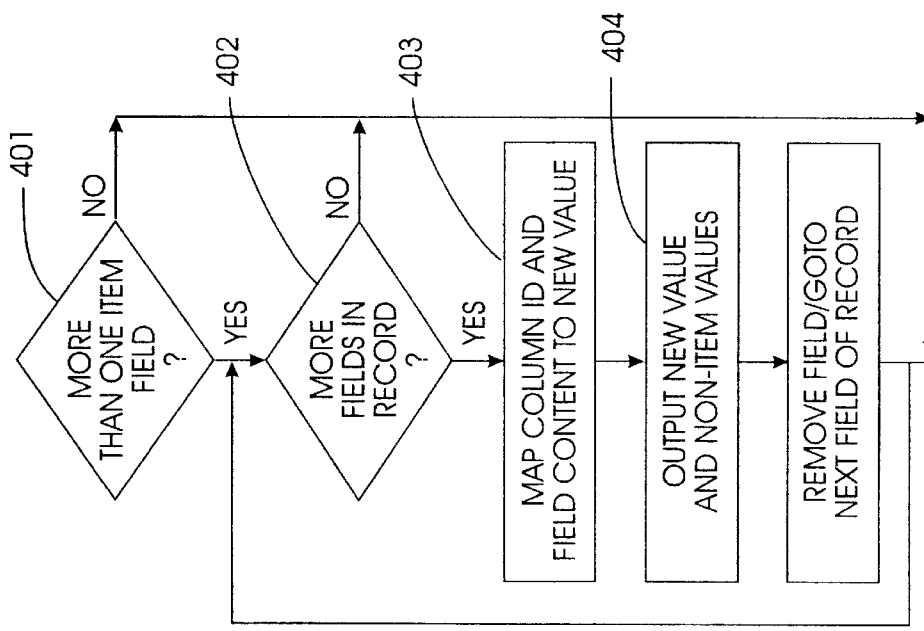
FIG. 4 visualizes how the preprocessing step for transforming each database record into one or more transaction records of transaction format according the current teaching of encoded transaction items works.
FIG. 5 depicts the complete preprocessing result of the introduced teaching with the encoded transaction items based on the example of FIG. 1. In this case the item types (i.e. the columns of the table) Age, State and Item were selected as item columns and the TA column was selected as the transaction id column.

If the current invention is referring to a database (for instance a relational database), a table or a record these terms have to be understood from a conceptually point of view only. The term database has to be understood in its most general meaning referring to any amount of data. The data may be stored in a flat file or in an actual database. Moreover the current teaching does not require that the data is stored persistently. The current teaching may also be applied to volatile data stored somewhere in in-core memory. Also it is not necessary that the data actually is physically organized as a table structure made out of records. For the current invention it is insufficient that the data can being viewed from a logical point of view organized in tables made out of records with a multitude of individual record fields.

Introduction

Typically the source data to which data mining technology is applied to is made available as tables made up of a multitude of records which in turn are made up of a multitude of fields (representing the table columns). FIG. 1 depicts an example of such a table. The individual records of the table comprise the following individual fields: Customer, TA, Age, Gender, State, Item. The significance of most fields follows directly from the naming; the field "TA" contains the unique transaction identification through which a particular customer ordered a certain product identified by the "Item" field.

Data mining technology like the APRIORI methodology for mining for association rules or for mining for sequential patterns cannot be applied to the original source format of the data like the table structure of FIG. 1. The APRIORI approach for instance depends on a special format of the data called transaction format which differs from usual multi-column format of FIG. 1. In case of associations the transaction format consists of only two columns, namely a "transaction identifier" and an "item identifier". In case of sequential patterns it consists of three columns, namely a "transaction group identifier", a "transaction identifier", and an "item identifier". FIG. 2 reflects the transformation result of the table of FIG. 1 into transaction format. FIG. 2a visualizes the transaction format adapted for mining of association rules while FIG. 2b portrays the transaction format adapted for mining of sequential pattern. It is important to realize that according the current state of the art all item values in the transaction format representation relate to a single item type only; in the current example the item type is the product ordered by the customer.

In both cases the item identifier must be treated as a so-called categorical variable. This means that the values of the item identifier are treated as strings. Given this kind of input data, the APRIORI based algorithms for association rules will find rules like:

If a transaction contains $item_o$ and $item_p$ and $item_q$ and . . . ,
then it will also contain $item_m$, $item_n$, . . .

Similarly, the APRIORI based algorithms for sequential patterns will find patterns like:

Transactions containing $item_o$ and $item_p$ and . . .
are followed by transactions containing $item_p$ and . . .
are followed by transactions containing . . .

With the current state-of-the-art approaches it is impossible to use the efficient APRIORI-based algorithms or other similar approaches for mining association rules or sequential patterns with more than one item field. Thus according the current state of the art, like the APRIORI based methodologies, are unable to derive rules which in application to the current example would be able to associate the ordering of a certain PRODUCT1 (Item) and/or the age (Age) and/or the gender (Gender) and/or the state of residence (State) of the customer with the probability of ordering another PRODUCT2 (Item).

The only solution known in the state which is capable of treating database records with more than one item is the case where all items relate to the same item type. An example of such a case is visualized in FIG. 3. According to this solutions the database table 301 can be transformed into transaction format even there is more than one item field 302 to 305 because the type and the semantics of the item fields are all the same. In this special case a method called "pivot" can be used to transform the multi-field input into the classical transaction format reflected in FIG. 3 as 310. As can be seen from FIG. 3 every record of the multi-column data base is transformed in a multitude of transaction records having transaction format. For every item in a certain record of the multi-column table an individual transaction record is generated where all transaction records resulting from the same record of the multi-column database table reflect the same transaction identification.

The Fundamental Encoding Scheme for Handling a Multitude of Item Types

Given the input data of the table in FIG. 1, it is desirable that the well-known mining techniques for association rules and sequential patterns could be used to find rules like "if State is MA, then Item is 20" and respectively to find sequential patterns like "State is MA and Item is 20 is followed by State is CA and Item is 30". These kind of results are different from the current results in the sense that not only attribute values appear in rules or patterns (MA, CA, 20, 30). With multi-column data and items of different types it is important to have also the column names (for example: State and Item) as part of the result.

A multi-column table is a set of n columns $\{c_1, c_2, \ldots, c_n\}$ (n>2). Each column $c_k$ has an identifier $i_k$ and a type $t_k$. Efficient algorithms for association rules can only process two-column tables $\{c_1, c_2\}$ and use one column as a so-called transaction identifier (or transaction identification) and the other column as the item identifier (or transaction item). Likewise, sequential patterns algorithms use three-column tables $\{c_1, c_2, c_3\}$ and use one column as a so-called transaction group identifier while and the semantic of the remaining two columns correspond to that of the association rule algorithm (comprising a transaction identifier and an item identifier).

Since the main objective of this invention is to allow the usage of multiple columns as items and thus extend the known mining methodologies with the capability to derive rules between items of different types, we need to define also an abstract notion for item values, i.e. the values of the item identifiers. Given a column $c_k$, and a record number m we denote the value of the column $c_k$ in that specific record with val($c_k$, m). For instance, the value of the column "State" in the first record of the table in FIG. 1 is CA: val(State, 1)=CA. It is not necessary, that the val function returns the original values in the data. It might also be the case, that a value mapping is used to map continuos values to interval (discretization).

The basic idea of the current invention is to teach the concept of a new transaction item, called encoded transaction item. The encoded transaction item represents a single value which simultaneously encodes not only the transaction item but also the item type. Using such an approach it is guaranteed that transaction items of different item types always are represented by different values of the encoded transaction item. Operating on records set up according to this new transaction format state of the art mining methodologies are transparently enabled to handle items of different item types as the encoding scheme will map different item types onto different encoded transaction items independent of the value of the transaction item. As will be shown below different mappings are available to encode the item type and the value of the transaction item into a single encoded transaction item.

In more formal terms the presented mechanism introduces a mapping function map(i, val(i, m)) which encodes the column identification and the value of an item column of record m in a single value. Two additional functions are introduced to define the behaviour of the mapping function:

1. Column(encodedValue) will return the column of an encoded value generated with the map function.
2. Value(encodedValue) will return the value of the item which was encoded by the map function.

The mapping function must be designed such that for all pairs of i and m the following two conditions hold:

1. Column(map(i, val(i, m)))=i
2. Value(map(i, val(i, m )))=val(i,m)

or in other words, the encoded transaction item is uniquely decode-able into the corresponding value of the transaction item and the corresponding item type.

Using the New Encoding Approach Within Data Mining

As outlined above the idea of the invention is to transform multi-column data into the data format which can be handled by the existing algorithms without loosing any information contained in the original table.

FIG. 4 visualizes how the preprocessing step for transforming each database record into one or more transaction records of transaction format according the current teaching of encoded transaction items works. Described in general terms and given a multi-column table with m columns out of which n columns (denoted $c_1, c_2, \ldots, c_m$) have been selected as input for item values wherein the items may represent any mixture of same or different item type, the method works as follows (refer also to FIG. 4):

For each record in the input data containing columns $c_1, c_2, \ldots, c_n$ the corresponding column identifications and values are extracted (401, 402). Then the encoding map($i_k$, val($i_k$,p)) is calculated (403). As output (404) the mechanism generates a two-column table for associations and a three-column table for sequential patterns containing (transaction identification, encoded transaction item) pairs and (transaction group, transaction identification, encoded transaction item) tuples respectively.

Of course for the application of the current it doesn't matter whether the output of the mapping mechanism is directly stored as a physical table of some sort database or not; i.e. the output finally processed by the data mining methodology may also be provided in the volatile computer memory only. It can also be implemented as a special cursor for the input data which does the transformation without any physical storage.

A Potential Mapping Function

Of course various mapping function are possible which satisfy above mentioned conditions.

One example for the mapping function a function can be introduced which just concatenates the name of a column, the item type in a string representation, and the "stringified" value of an item, i.e. the value of the transaction item. Additionally, an optional separator character "@" can be used to ensure that the Column and Value function will work properly. Taking the first record of the data in FIG. 1 as an example and applying this mapping function to the State column will return "State@CA". FIG. 5 depicts the complete result of an application of the introduced mechanism for the case where Age, State and Item were selected as item columns and the TA column was selected as the transaction id column. Obviously this is the kind of data which is used as input for the search for association rules.

As a further example for the mapping function the following mapping would be possible: the values of the items of the various item types could be mapped onto non-overlapping sub-ranges of a common range with the result that encoded transaction items which relate to different item types are always different with respect to the encoded transaction value.

Advantages of the Invention

The current invention extends data mining technology according to the current state of the art and is now also supporting the mining for association rules and/or sequential patterns based on data assets comprising items of a multitude of item types. While current activities in this area of technology are concentrating on the search for new and advanced mining algorithms the current invention is able to achieve this goal by features pointing in a completely different and surprising direction. Instead of proposing a new mining algorithm the current invention suggests a new pre-processing step which transforms the data to be mined into a new encoding scheme. The usage of multiple fields to be defined as item fields for efficient mining for association/sequential patterns is supported without a need to introduce a new algorithm because data is not in transaction format. Thus mining algorithms proved to be very efficient and optimized during the last years are still applicable.

The current approach is completely general in nature thus that no restrictions on the type or semantics of the item fields do apply. Therefore state-of-the-art associations and sequential pattern algorithms can be applied for mining to arbitrary data based on the transformation output of the pre-processing step.

A further characteristics of the proposed teaching case is its efficient usage of computer memory. No additional copying of data is required and moreover the current approach does not need additional disk space being an important point in view of the usual large amounts of data to be mined.

Moreover during the encoding process of the encoded transaction items an implicit mapping of item values may be possible. The continuous and/or numerical values of the items occurring in the original data assets can be mapped to intervals on the fly. Therefore the search for so-called quantitative association rules is directly supported.

The mining output generated by the mining algorithms will reflect the column names (as the item type is encoded into the transaction item) of the original data schema used as input data. This eases the interpretation of the rules/sequential patterns significantly.

What is claimed is:

1. A computerized method of data mining for association rules and/or sequential patterns in a multitude of records using a data-mining technique that processes transaction-records only in transaction format, each said record in said multitude of records having a transaction identification and at least one transaction-item to be data-mined, said transaction-item being of a corresponding item-type, said multitude of records including transaction-items to be data-mined of different item-types, comprising the steps of:

encoding each transaction-item to be data-mined and its corresponding item-type to form an encoded transaction-item, said encoded transaction-item consisting of a single encoded value;

creating a transaction-record in transaction-format for each transaction-item to be data-mined, said transaction-record comprising the transaction-identification of the record containing said transaction-item to be data-mined and said single encoded value; and data-mining said transaction-records for association rules and/or sequential patterns using said data-mining technique.

2. Method according to claim 1, wherein said known data-mining technique is the "APRIORI" technique.

3. Method according to claim 1, wherein said encoded transaction-item is decodeable into the transaction-item and its corresponding item-type from which it was formed.

4. Method according to claim 2, wherein said encoded transaction-item is generated by concatenating said item-type and said transaction-item.

5. A system comprising means adapted for carrying out the steps of the method according to claim 1.

6. A data processing program for execution in a data processing system comprising software code portions for performing a method according to claim 1.

7. A computer program product stored on a computer usable medium, comprising computer readable program means for causing a computer to perform a method according to claim 1.

* * * * *